Sept. 3, 1968  F. P. BUITING ET AL  3,400,250

HEATING APPARATUS

Filed Jan. 3, 1966

INVENTORS:
JOSEPH W. WASELESKI,
FRANCIS P. BUITING,
BY John C. Haug
ATT'Y.

3,400,250
HEATING APPARATUS
Francis P. Buiting, Plainville, and Joseph W. Waseleski, Jr., Mansfield, Mass., assignors to Texas Instruments Incorporated, Dallas, Tex., a corporation of Delaware
Filed Jan. 3, 1966, Ser. No. 518,255
9 Claims. (Cl. 219—441)

This invention relates to heating apparatus and more particularly to electrical heating devices with improved means to limit the quantity of heat produced and which are particularly useful with coffee percolators and the like.

Electrical heating devices are many and varied however in the prior art these devices have generally required the use of thermostats along with a heating element to prevent overheating of the heating element, i.e. as a safety means, and also to keep the heating device in the environs of a desired temperature by turning on and off the heating element current by use of movable contacts. This, of course, requires the use of components in addition to the heating element per se which adds significantly to the cost of materials as well as labor in assembling the heating device and further, due to mechanically movable parts, such devices have a limited longevity and tend to chatter after a relatively short period of time. Further, due to the cycling effect some overheating results of the coffee or like fluid in the immediate environs of the heater during the peak portions of the cycles (overshoot).

On relatively expensive heating devices when precise temperature control is required another approach has been employed using proportional control means whereby relatively complex electrical circuits serve to limit the power input to the heating element to equal the heat loss from the heating device. This is done, for example, by providing a bridge containing a temperature-sensing device which is used to balance a circuit containing the heating element. This type of control eliminates the on/off moving contacts and therefore provides more precise temperature control and more constant power requirements. However the device is much too complex and expensive fo use with coffee percolators and the like.

It has been discovered that by the use of certain materials which display a positive temperature resistivity coefficient, hereinafter referred to as PTC material, a simple, inexpensive heating device can be made which is self-regulating, i.e., the PTC material serves a function analogous to the thermostat by limiting the amount of heat produced. Examples of such materials are ceramic like doped barium titanate (e.g. $Ba_{.997}La_{.003}TiO_3$) and carbon black filled, cross-linked polyethylene.

It is an object of this invention to avoid the above-mentioned liabilities of the prior art by the provision of an electrical heating device which is simple, highly reliable, long lasting which will not chatter nor over heat.

It is another object of the invention to provide heating apparatus which has a self-regulated temperature.

Yet another object of the invention is the provision of a heating device having a primary heater useful for percolating coffee or like fluid and a secondary heater useful to thereafter keep the fluid at an elevated temperature without overheating any of the fluid.

Still another object of the invention is the provision of a heating device having a primary and secondary heater, both heaters having a self-regulated temperature.

The invention accordingly comprises the elements and combinations of elements, features of construction, and arrangements of parts which will be exemplified in the structures hereinafter described, and the scope of the application of which will be indicated in the following claims.

In the accompanying drawings, in which several of the various possible embodiments of the invention are illustrated.

Similar reference characters indicate corresponding parts throughout the several views of the drawings.

Figure 1:
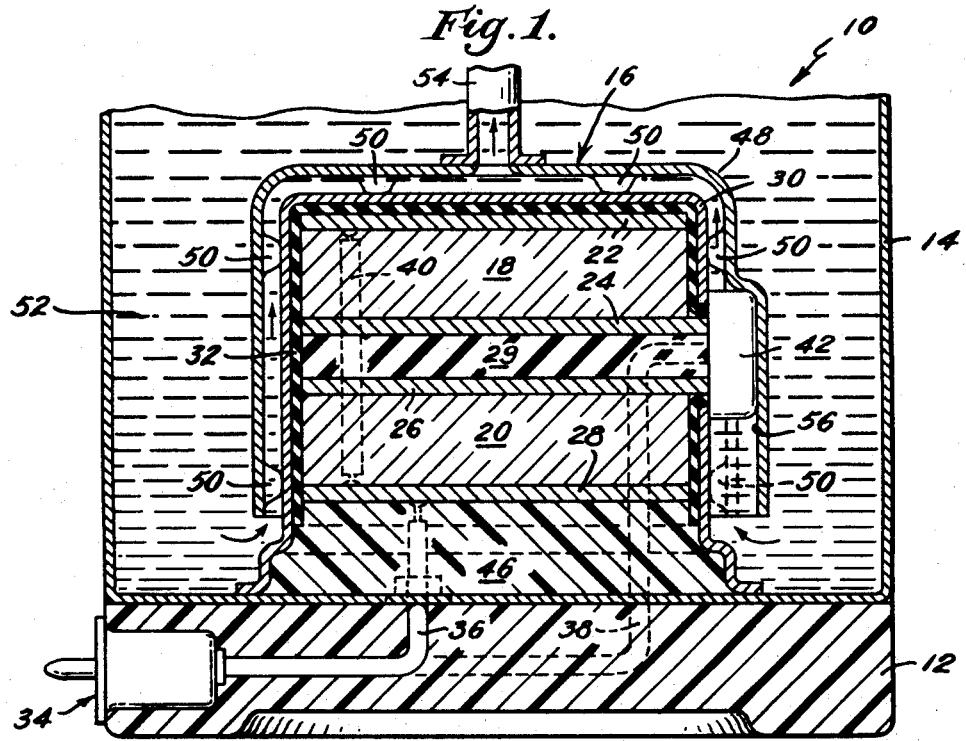
FIGURE 1 is a vertical cross-sectional view through one embodiment of the invention.

Dimensions of certain of the parts as shown in the drawings may have been modified and/or exaggerated for the purposes of clarity of illustration.

Figure 3:
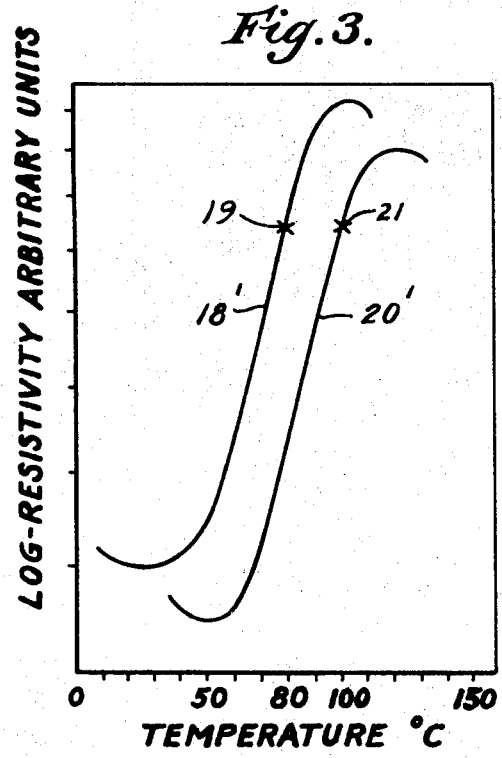
FIGURE 3 is a chart showing log resistivity versus temperature curves of the heating element used in the FIG. 1 embodiment.

The PTC elements used in accordance with this invention act as a heater and also as their own temperature regulator. The PTC material has a low resistance in the cold state and when power is applied through the heating circuit relatively large currents are drawn when in the cold state and consequently relatively high power and heat are dissipated. FIGURE 3 shows resistivity versus temperature of two heaters formed of PTC material. As the temperature increases beyond an anomaly point the resistance rapidly increases and only a slight temperature rise until the heat dissipated is balanced by the heat generated (indicated by X's 19 and 21). The temperature of the elements is thereby controlled at 19 and 21 on the curves 18' and 20' of FIGURE 3. Concomitant with the increase in resistance is a decrease in power. It will be seen that if heat demand is increased (heat dissipation) the temperature of the PTC material is reduced causing a drop in resistance, an increase in current ($E=IR$) until once again the temperature is increased causing the resistance to increase so that once again the heat generated is balanced by the heat dissipated. Therefore it will be seen that the degree of temperature control obtained depends on the steepness of the $R=f(T)$ curve.

Figure 2:
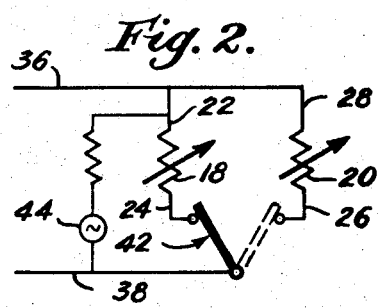
FIGURE 2 is a schematic wiring diagram of the FIG. 1 embodiment.
Figure 4:
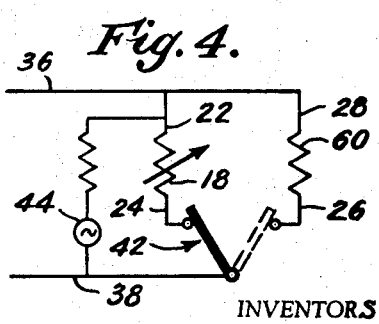
FIGURE 4 is a schematic wiring diagram of a second embodiment of the invention.

Referring to FIGURES 1–3 of the drawing the first embodiment is generally indicated by numeral 10. It consists of a base member 12 constructed of an electrically insulating material such as a phenolic resin. Mounted on base 12 is a container 14 in which is located the heating assembly 16. Assembly 16 includes two heating elements, viz., blocks or pills 18 and 20, which are formed of PTC material, as explained supra, having a steep sloped positive temperature coefficient. Conductive layers 22, 24 and 26, 28 are electrically connected to two opposite sides of pills 18 and 20 respectively, as shown, in a conventional manner as by ultrasonic soldering when the pills are of doped barium titanate or by conventional fasteners such as electrically insulating screws when the pills are of carbon black filled polyethylene. Conductive layers 24 and 26 are separated by a conventional electrically insulating layer 29. Pills 18, 20 are positioned within a cup-shaped member 30 formed of a good thermally conductive material, which is provided with an electrically insulating lining 32 to prevent short circuiting between the conductive layers. Conventional electrical connector means 34 is provided in the base member 12 and has issuing therefrom conductors 36, 38. Conductor 36 is electrically connected to conductive layer 28 while conductor 38 is connected to a common terminal (see FIG. 2) in a switch 42 mounted on member 30. Conductive layers 24 and 26 are connected to separate terminals in the switch. Conductor 40 electrically connects layers 28 and 32. Switch means 42 closes the circuit containing either PTC pill 18 as shown in solid lines in FIG. 2 or alternatively, the circuit containing PTC pill 20, shown in dotted lines. A pilot light may be provided to show when element 18 is energized. Electrical insulation preferably in the form of a conventional potting material 46, encloses member 30 with the heating element therein.

A cover member 48 is placed over container 30. It will be noted that spacing and locating means in the form of protrusions 50 are provided to properly seat member 48 and provide a path for liquid to enter tube 54. Cover 48 is formed with a channel 56 into which switch 42 is received.

FIGURE 3 shows the temperature-resistivity curves of PTC pills 18, 20. Pill 20 is a primary heater and will self heat until the liquid 52 and hence heater 20 reach approximately 100° C., or point 21 on curve 20′, at which time switch 42, which is temperature responsive, will switch to the solid line position in FIG. 2 and energize pill 18. As will be noted in FIG. 3 pill 18, curve 18′, has a lower anomaly point and has a lower self heat temperature 19—shown at approximately 80° C.—which keeps the liquid 52 warm without overheating. Pilot light 44 lights up when secondary heater 20 is energized.

In some instances it may be desirable to employ a conventional heater as the primary heater and while still using a PTC heater as the secondary heater. This will still provide very low generation of power to maintain a balance between heat dissipated and heat generated, prevent overheating of portions of the fluid thereby avoiding a bitter taste resulting from overheating yet still avoiding a chattering thermostat.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

We claim:

1. A two stage fluid heater which has a temperature regulating character comprising:
    (a) a base of electrically insulating material;
    (b) a first pill of PTC material mounted on the base;
    (c) electrically conductive layers attached to two opposite faces of the first pill;
    (d) a second pill of PTC material adjacent to and electrically separated from the first pill;
    (e) electrically conductive layers attached to two opposite faces of the second pill;
    (f) electrical conductors connected to each of the layers;
    (g) switch means mounted in the base and adapted in one position to electrically connect the first pill to a power source and in a second position to electrically connect the second pill to the power source; and
    (h) a fluid channel forming member positioned over the PTC pills and adapted to direct fluid flow in contiguous heat relation thereto.

2. A heater as defined in claim 1 in which the temperature-resistivity curve of the second pill has a lower anomaly temperature than the first pill.

3. A heater as defined in claim 2, which further comprises a container adapted to contain a fluid and in which the heater is mounted; and in which the position of the switch is dependent upon the temperature of the fluid contained in the container.

4. An electrical heater comprising:
    (a) a base of electrically insulating material;
    (b) a first and second heater mounted on the base;
    (c) electrical means to separately connect the first and second heater to a power source including a temperature responsive switch which is adapted to connect the second heater to the power source when a predetermined elevated temperature is reached by the first heater;
        the second heater constructed of PTC material whereby an electrical current passing therethrough will cause the second heater to heat up until an electrical, thermal equilibirium is reached limiting the temperature of the second heater.

5. An electric heater as defined in claim 4 in which the first heater is a standard resistance heater.

6. An electric heater as defined in claim 4 in which the PTC material is selected from the group consisting of carbon black filled, cross-linked polyethylene and doped barium titanate.

7. An electric heater as defined in claim 4 in which the first heater is constructed of PTC material having an anomaly temperature higher than that of the second heater.

8. An electric heater as defined in claim 7 further comprising:
    (d) a fluid container in which is mounted the heaters;
    (e) a fluid channel forming member positioned over the heaters,
        the channel member including spacing means keeping the channel member spaced from the heaters;
    (f) an electrically insulating material encasing the heaters; and
    (g) a thermally conductive casing positioned about the heaters and in contact with the channel member spacing means.

9. An electric heater as defined in claim 4 further including a pilot light which is actuated when the second heater is connected to the power source.

References Cited

UNITED STATES PATENTS

| | | | |
|---|---|---|---|
| 2,912,557 | 11/1959 | Michaelis | 219—505 XR |
| 2,947,844 | 8/1960 | Howllng | 219—505 |
| 3,067,311 | 12/1962 | Lacy-Hulbert | 219—504 |
| 3,060,298 | 10/1962 | Swanson | 219—505 |
| 3,338,476 | 8/1967 | Marcoux | 219—505 XR |

FOREIGN PATENTS 490,481   8/1938   Great Britain.

BERNARD A. GILHEANY, *Primary Examiner.*

H. B. GILSON, *Assistant Examiner.*